(12) United States Patent
Tester

(10) Patent No.: US 7,272,713 B1
(45) Date of Patent: Sep. 18, 2007

(54) CONTROLLING FILE OPERATIONS

(75) Inventor: Jonathan A. Tester, Encinitas, CA (US)

(73) Assignee: Symantec Corporation, Cupertino, CA (US)

( * ) Notice: Subject to any disclaimer, the term of this patent is extended or adjusted under 35 U.S.C. 154(b) by 768 days.

(21) Appl. No.: 10/691,443

(22) Filed: Oct. 22, 2003

(51) Int. Cl.
*G06F 9/00* (2006.01)

(52) U.S. Cl. ............... 713/151; 713/152; 713/161; 713/164

(58) Field of Classification Search ............ 713/151, 713/152, 161, 164
See application file for complete search history.

(56) References Cited

U.S. PATENT DOCUMENTS 5,442,690 A * 8/1995 Nazif et al. ............ 379/201.03
5,557,775 A * 9/1996 Shedletsky ............... 703/13
5,778,226 A * 7/1998 Adams et al. ............ 719/311
5,825,759 A * 10/1998 Liu ........................ 370/331

OTHER PUBLICATIONS

Steve Bremer, Linux Intrusion Detection System (LIDS) FAQ., Apr. 27, 2002, originally at http://www.clublinux.org/lids/LIDS-FAQ.txt currently at http:// web.archive.org/web/20020602181923/http://www.clublinux.org/lids/LIDS-FAQ.txt.

\* cited by examiner

*Primary Examiner*—Thomas R. Peeso
(74) *Attorney, Agent, or Firm*—Van Pelt, Yi & James LLP

(57) ABSTRACT

A technique is disclosed for protecting a file. In one embodiment, the technique comprises requesting access to a file, accessing a vnode associated with the file; and executing a substitute routine associated with the vnode.

29 Claims, 8 Drawing Sheets

CONTROLLING FILE OPERATIONS

FIELD OF THE INVENTION

The present invention relates generally to computer environments. More specifically, a technique for controlling operations associated with a file is disclosed.

BACKGROUND OF THE INVENTION

Using a file protection system to prevent unauthorized access to a file is highly desirable in today's computer environments. For example, a file protection system may be used to stop a file containing sensitive information from being opened or closed. File protection systems include systems such as intrusion detection systems (IDS), host intrusion prevention systems (HIPS), or host intrusion detection systems (HIDS).

Existing file protection systems exhibit many inefficiencies. File protection systems typically require a large amount of processing and overhead. For example, large databases are typically checked to compare files each time a file is accessed, which is CPU intensive and slows the system down considerably. Therefore, there is a need for a way to more efficiently implement a file protection system that decreases overhead processing and more efficiently uses CPU power.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for controlling operations associated with a file is disclosed. Controlling operations associated with a file has many applications. In one application, the technique can be used to provide file protection.

Figure 1:
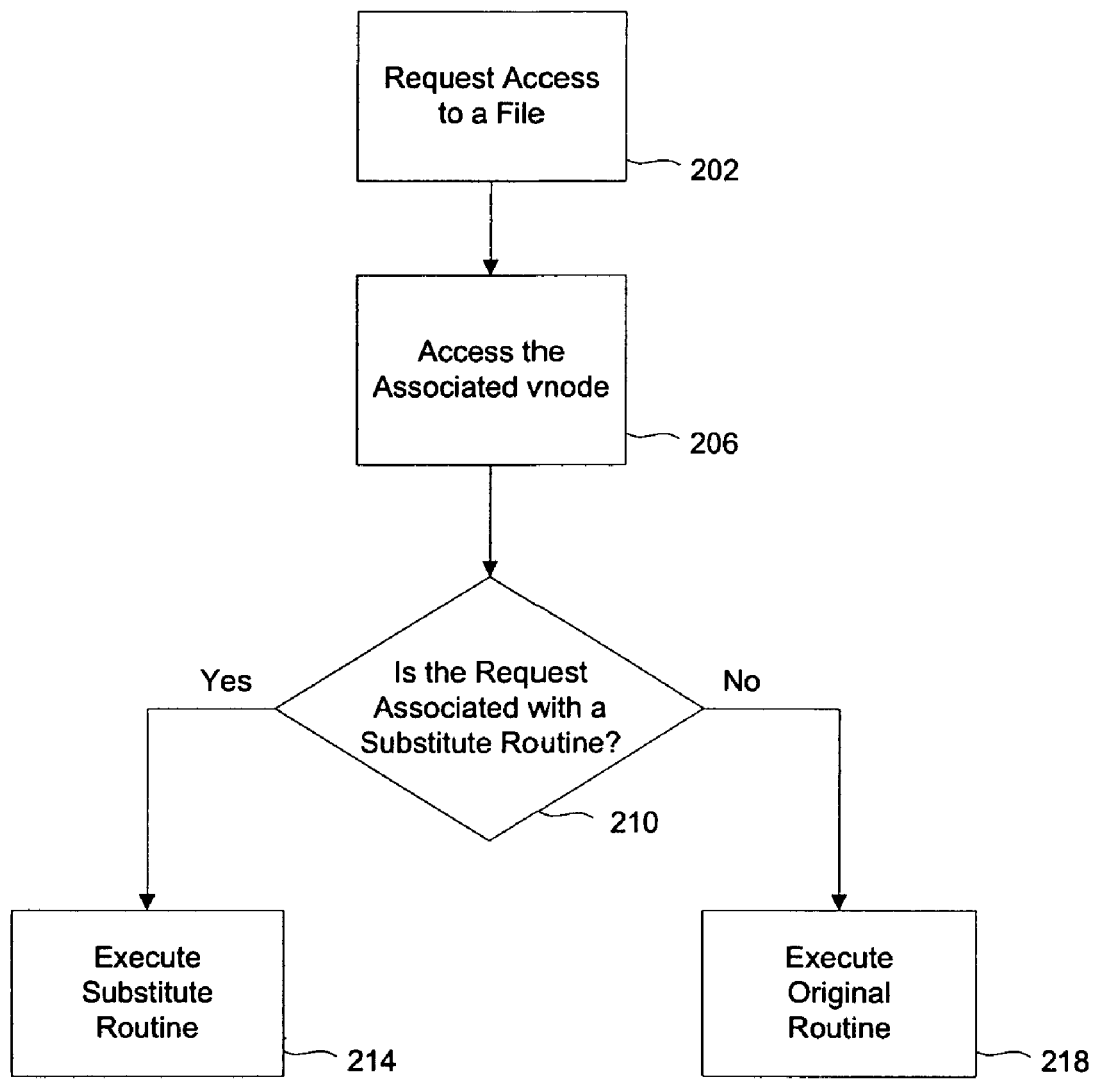
FIG. 1 is a flowchart illustrating a technique used in one embodiment to protect a file during runtime operation.

FIG. 1 is a flowchart illustrating a technique used in one embodiment to protect a file during runtime operation. A file, as used herein, includes a file, directory, process, and operation or any other object that may be associated with a vnode. Embodiments described with respect to one file may include any number of files. In this example, access to a file is requested (202). A file may be accessed to perform an operation, such as to read or write to the file. The request may be from any source, such as a user or an application. The vnode associated with the file is accessed (206). A vnode, as used herein, includes an internal representation of a file. For example, a vnode may include information on user permissions, the filename, the directory associated with the file, and operations associated with the file. Accessing the vnode associated with the file may include calling a look up function. For example, in UNIX systems, the lookupname function may be called.

It is determined whether the request is associated with a substitute routine (210). A substitute routine, as used herein, includes a routine that replaces an original routine when a file is configured for protection. Examples of actions taken by a substitute routine include alerting, blocking, and logging. In one example, a substitute open or close routine can alert an administrator if the file is opened or closed. In another example, a substitute read or write routine can block read and write operations to the file from a particular computer. Alternatively, a substitute routine can log or record all activity associated with the file, such as file removal. In one embodiment, a substitute routine is configured by a user.

Preferably, the determination (210) is inherent in the configuration and the substitute routine is automatically accessed without an explicit determination (210). In such an embodiment, the determination (210) is shown in FIG. 1 for the purpose of illustrating the types of routines that may be executed.

If the request is associated with a substitute routine, the substitute routine is executed (214). For example, if an unauthorized user requests read access, a substitute read routine that blocks read access may be executed. In another example, if an application opens a file, a substitute close routine that logs this event may execute. Alternatively, if a file associated with a process is removed, a substitute remove routine that logs this event may execute. If the request is not associated with a substitute routine, an original routine is executed (218).

In this embodiment, the technique follows substantially the same flow of events regardless of whether the file has been configured for protection. The file system handles vnodes the same way it did prior to file protection configuration. The fact that a modified vnode associated with a substitute routine may be accessed instead of an original vnode is substantially invisible to the file system.

Figure 2A:
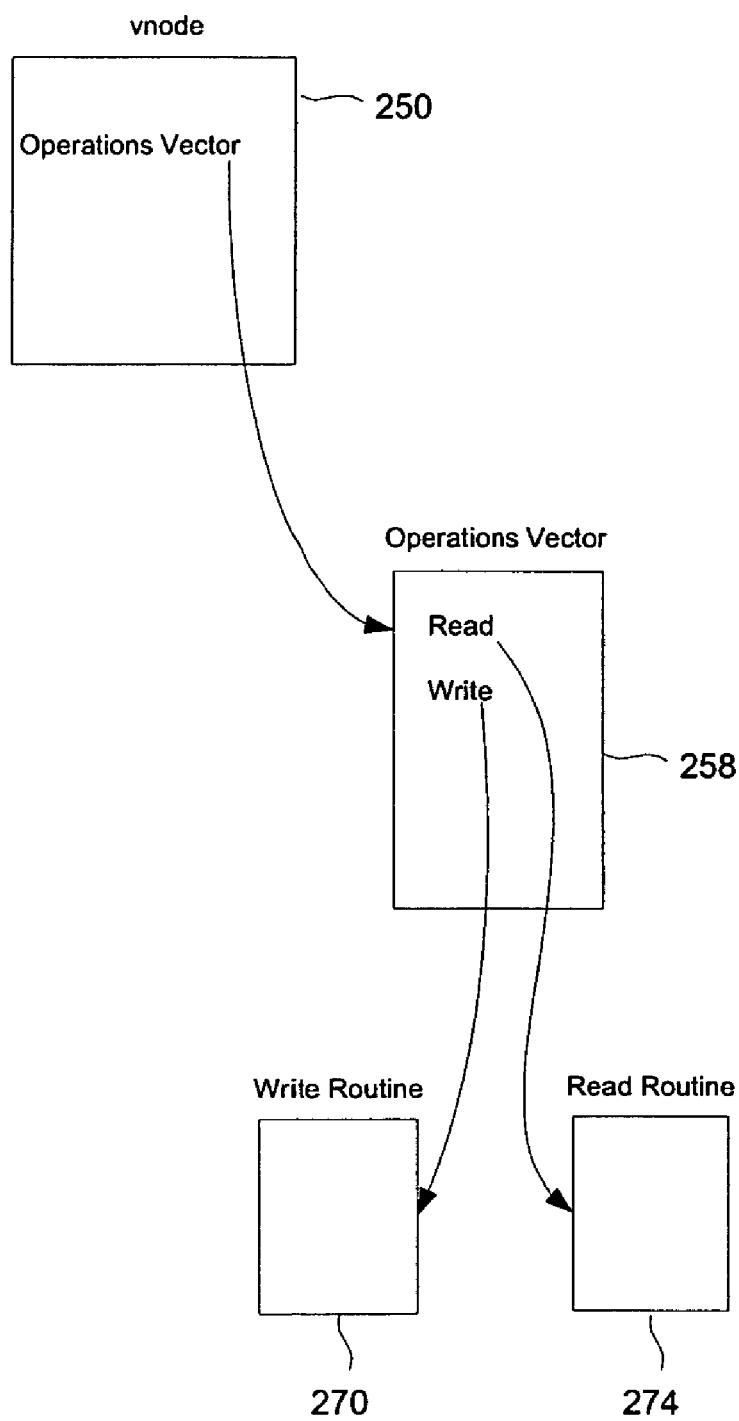
FIG. 2A is a conceptual diagram illustrating an example of one embodiment of a vnode.

FIG. 2A is a conceptual diagram illustrating an example of one embodiment of a vnode. A vnode may be associated with a routine in any number of ways. In this example, a vnode 250 is associated with a routine by using pointers. Vnode 250 is shown to include a pointer to an operations vector 258. An operations vector, as used herein, includes operations associated with a file, such as open, close, read, and write. For example, a vnode in a UNIX system has a pointer to an operations vector, vnodeops. Vnodeops includes operations vop_open (open), vop_close (close), vop_read (read), vop_create (create), and vop_mkdir (make directory). A vnode in a Linux system is called an inode, and the inode has a pointer to an operations vector, file_operations. In this example, operations vector 258 is shown to include a pointer to a read routine 274 and a pointer to a substitute write routine 270. Operations vector 258 may include pointers to a plurality of routines, including substitute routines, original routines, or both.

Figure 2B:
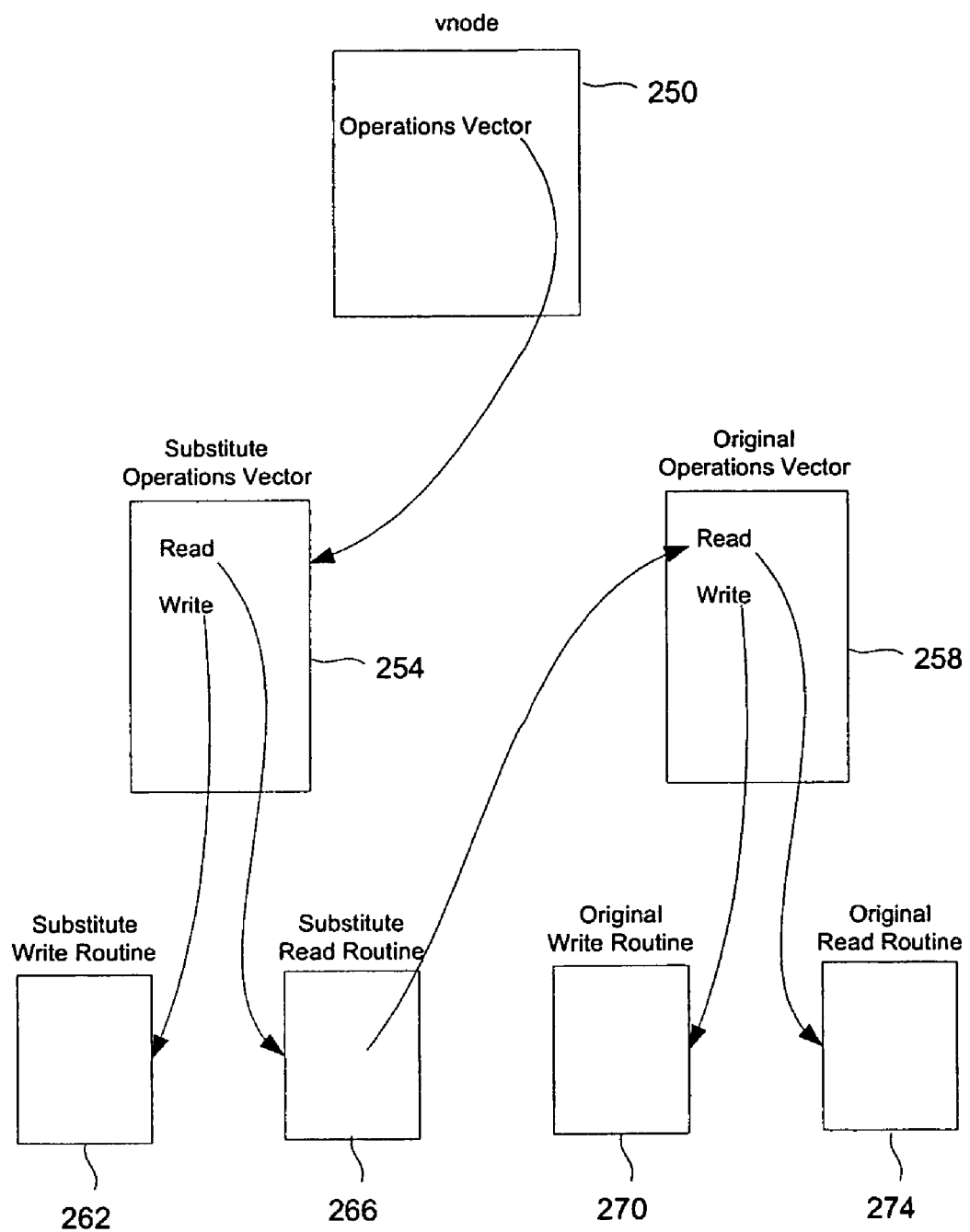
FIG. 2B is a conceptual diagram illustrating an example of one embodiment of a modified vnode.

FIG. 2B is a conceptual diagram illustrating an example of one embodiment of a modified vnode. In this example, vnode 250 is shown to include a pointer that has been modified from FIG. 2A to point to a substitute operations vector 254. Substitute operations vector 254 is shown to include a pointer to a substitute read routine 266 and a pointer to a substitute write routine 262. Substitute operations vector 254 may include pointers to a plurality of routines, including substitute routines, original routines, or both. Operations vector 258 and associated write routine 270 and read routine 274 are shown in FIG. 2B as original operations vector 258, original write routine 270, and original read routine 274 now that substitute operations vector 254 has been modified.

Figure 2C:
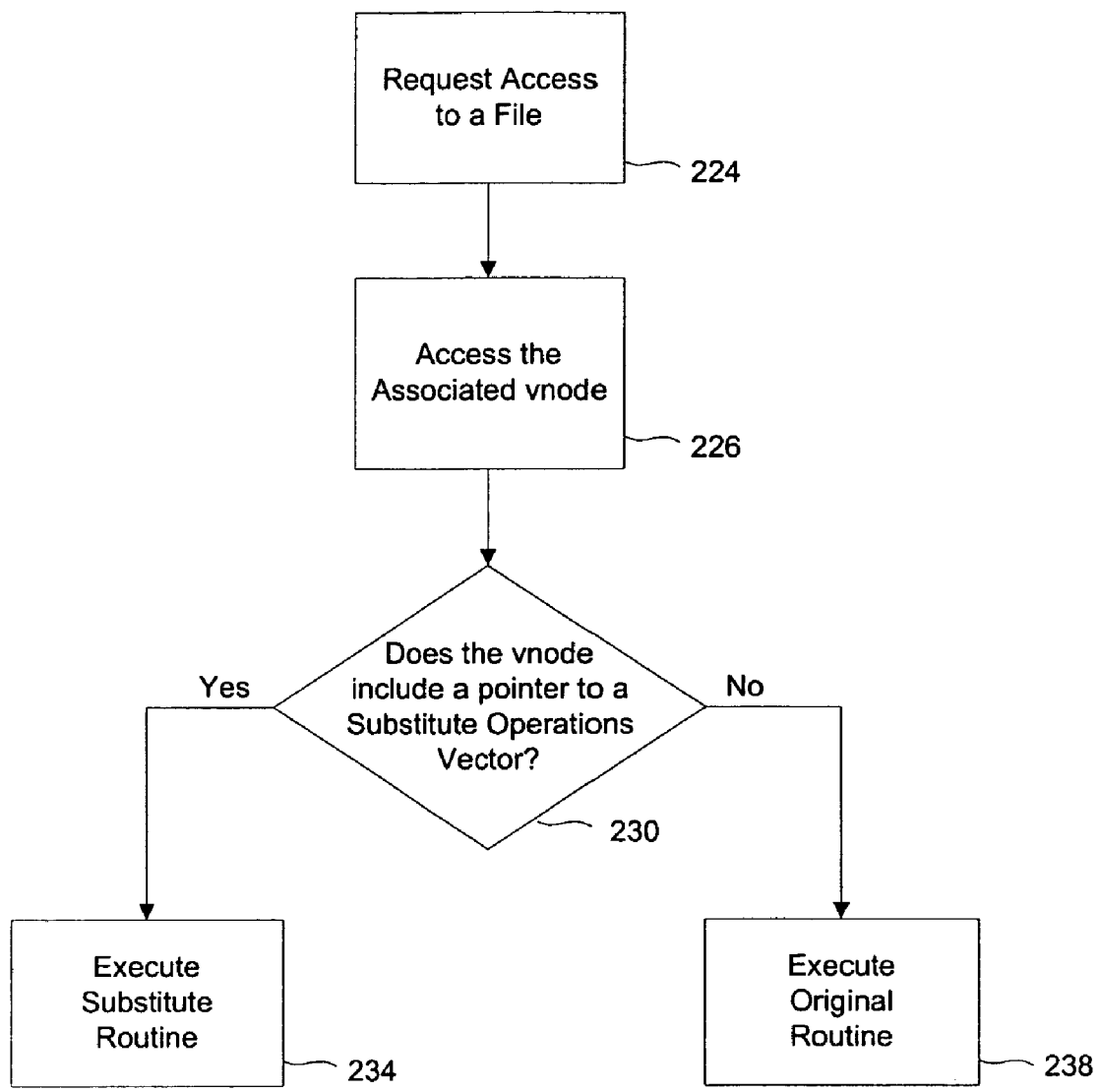
FIG. 2C is a flowchart illustrating a technique used in one embodiment to protect a file during runtime operation.

FIG. 2C is a flowchart illustrating a technique used in one embodiment to protect a file during runtime operation. In this embodiment, a vnode is configured as shown in FIG. 2B. In this example, access to a file is requested (224) for an operation. The vnode associated with the file is accessed (226). It is determined whether the vnode includes a pointer to a substitute operations vector (230) for the requested operation.

Preferably, the determination (230) is inherent in the configuration and the substitute routine is automatically accessed without an explicit determination (230). In the example of FIG. 2B, if a read request is processed, the substitute read routine is automatically accessed without an explicit determination (230).

If the vnode includes a pointer to a substitute operations vector, a substitute routine is executed (234). In the example of FIG. 2B, if a read request is processed, a read operation in substitute operations vector 254 calls substitute read routine 266. As a result, substitute read routine 266 is accessed and executed.

If the vnode includes a pointer to an original operations vector, an original routine is executed (238). In the example of FIG. 2A, if a read request is processed, a read operation in operations vector 258 calls read routine 274. As a result, substitute read routine 274 is accessed and executed.

In the embodiment illustrated in FIG. 2B, substitute read routine 266 calls original read routine 274. This embodiment is referred to as a "pass through embodiment," because original read routine 274 is "passed through" to substitute read routine 266. For example, it may be acceptable to allow read access. In this case, substitute read routine 266 includes a call to original read routine 274 and the read operation executes as it did before the file was configured for protection. In another example, it may be acceptable to allow read access to a file as long as an administrator is alerted each time. In this case, substitute read routine 266 may include instructions to alert an administrator and call original read routine 274.

Alternatively, substitute operations vector 254 may include a pointer directly to an original routine for an operation. As a result, if that operation is requested, the original routine is still executed.

Figure 3A:
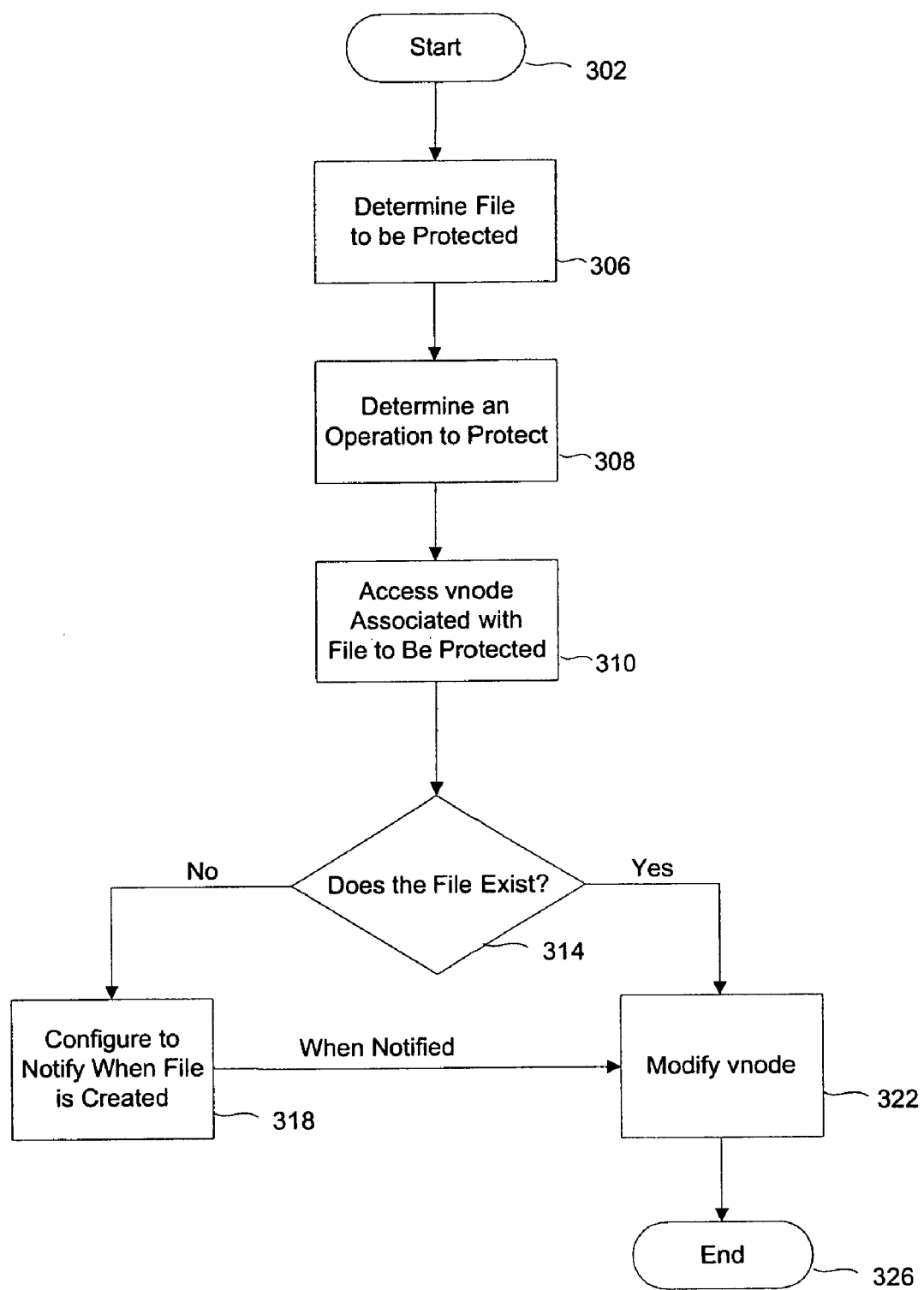
FIG. 3A is a flowchart illustrating a technique used in one embodiment to configure a file for protection or install protection of a file.

FIG. 3A is a flowchart illustrating a technique used in one embodiment to configure a file for protection or install protection of a file. In this example, a file to be protected is determined (306). For example, it may be determined that a file to be protected is a spreadsheet of employee salaries. Alternatively, a directory may be associated with a file and a directory to be protected may be determined. In some embodiments, it may be determined that a plurality of files is to be protected and each file is configured for protection according to the method in this example. For example, it may be determined that 100 files are to be protected. In one embodiment, after the file to be protected is determined, this information is sent to the kernel.

A file operation to be protected is determined (308). For example, to restrict reading from a payroll file, it may be determined that the read operation is to be protected. A plurality of operations may be protected for a file. For example, the read and write operation of a payroll file may both be protected.

A vnode associated with the file is accessed (310). For example, a look up function may be called. In UNIX systems, lookupname may be used.

It is determined whether the file exists (314). For example, a look up function may return an indication of whether the file exists. If the file exists, the vnode is modified (322). Further details of modifying the vnode are discussed in conjunction with FIG. 3B. If the file doesn't exist, configuration is performed to provide notification when the file is created (318). In one example of configuring to provide notification when the file is created, the associated directory file is accessed and its associated create operation is modified to provide notification when the file is created. In UNIX systems, vop_create may be replaced with a substitute routine that provides notification when the file is created. When the file is created, the vnode is modified (322).

Figure 3B:
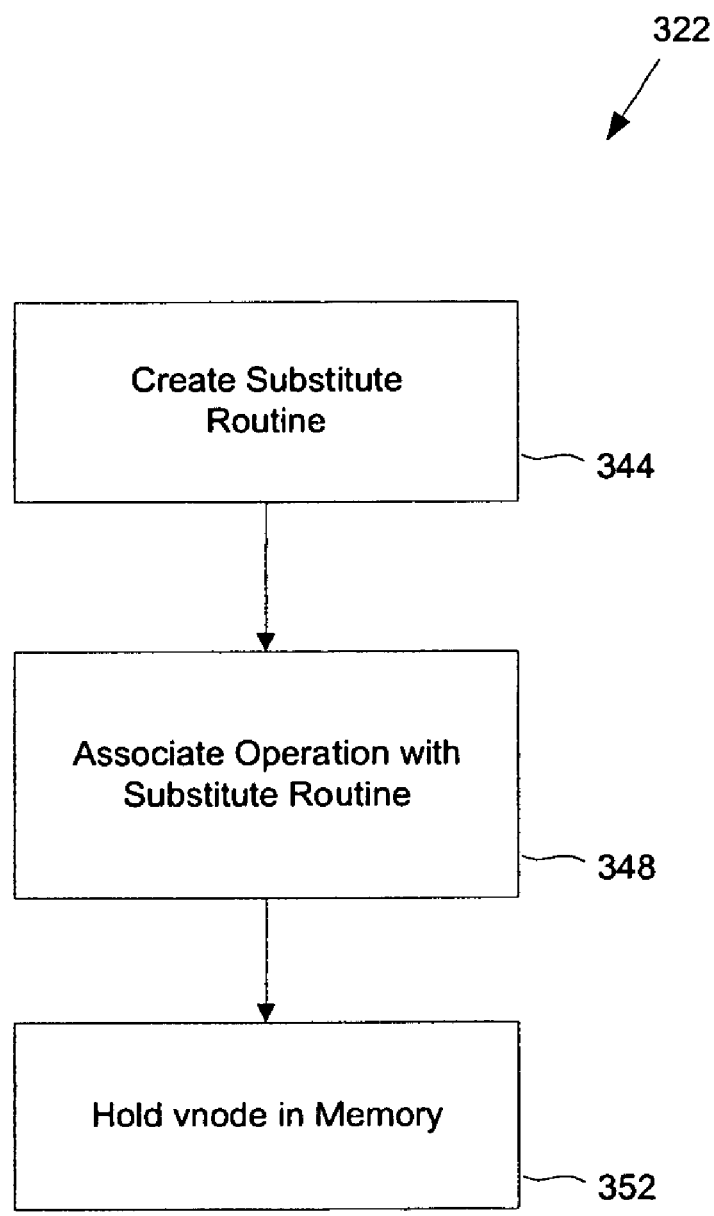
FIG. 3B is a technique illustrating a method used in one embodiment to modify a vnode when configuring a file for protection.

FIG. 3B is a flowchart illustrating a technique used in one embodiment to modify a vnode (322 of FIG. 3A) when configuring a file for protection.

A substitute routine is created for an operation to be protected (344). For example, a substitute write routine that blocks write access may be created for a sensitive file.

The protected operation is associated with the substitute routine (348). For example, in the example of FIG. 2B, vnode 250 has been modified from FIG. 2A by redirecting a pointer to point to substitute operations vector 254. As a result, when the read operation is accessed, substitute read routine 266 is called.

In one embodiment, the vnode is held in memory (352). For example, a vnode hold may be used. In another embodiment, holding the vnode in memory may not be available or desired.

Thus, a file may be protected by modifying an associated vnode so that when the file is accessed, a substitute routine is executed.

Figure 3C:
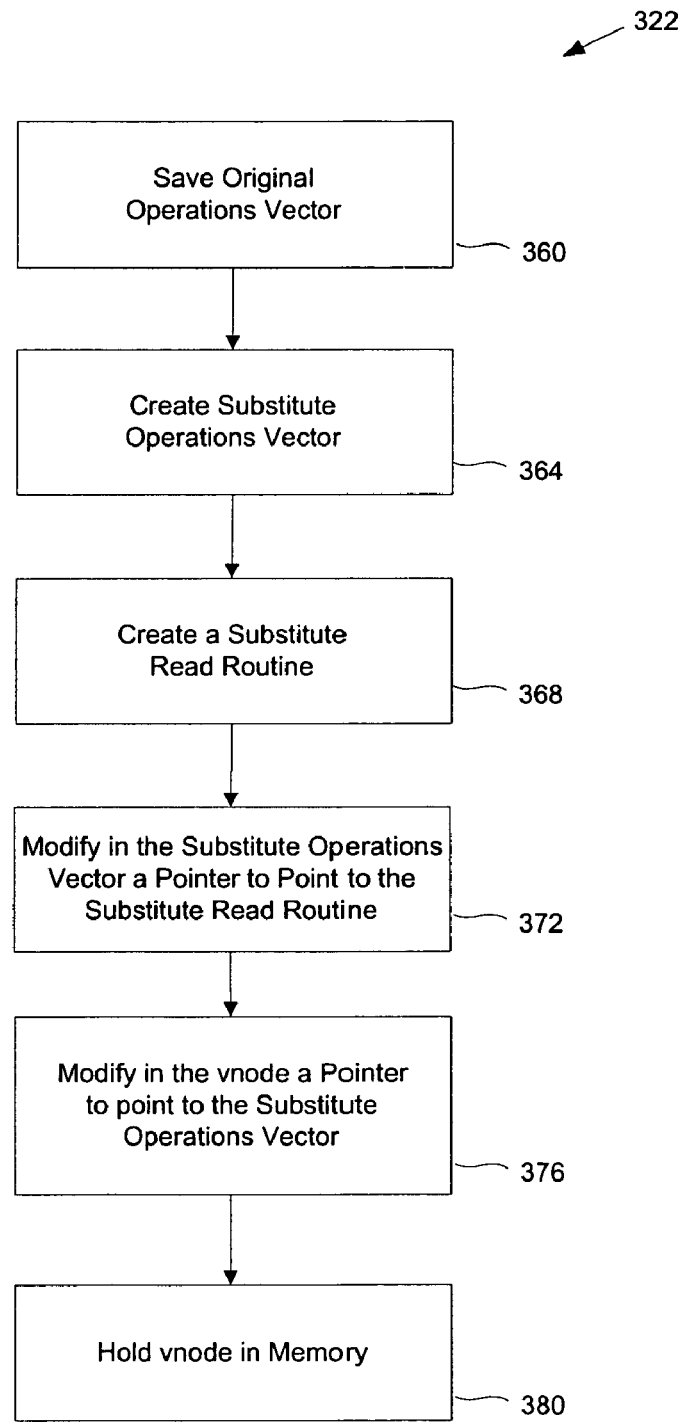
FIG. 3C is a technique illustrating a method used in one embodiment to modify a vnode when configuring a file for protection when the read operation is accessed.

FIG. 3C is a flowchart illustrating a technique used in one embodiment to modify a vnode (322 of FIG. 3A) when configuring a file for protection when the read operation is accessed. In this embodiment, a vnode is configured as illustrated in FIG. 2B.

In this example, an original operations vector is saved (360). In other embodiments, it may not be desirable or necessary to save the original operations vector. However, it may be desirable to save the original operations vector for many reasons. For example, when file protection is removed or uninstalled, the saved original operations vector may be used to return the vnode to its original configuration. In another example, as illustrated in FIG. 2B, substitute read routine 266 includes a pointer to original operations vector 258 in order to access original read routine 274.

A substitute operations vector is created (364). In one embodiment, creating a substitute operations vector includes allocating memory for the substitute operations vector. A substitute operations vector may be similar to the original operations vector except for changes to routines associated with operations to be protected. In one embodiment, a substitute operations vector is created by initially making a copy of an original operations vector.

A substitute read routine is created (368). For example, to configure the file to block a distrusted user from reading the file, the substitute routine may include instructions to deny read access to the distrusted user but otherwise call the original read routine by accessing the saved original operations vector (360). In this example, the substitute read routine may include a pointer to a pointer in the original operations vector in order to access the original read routine, as illustrated in FIG. 2B. In the substitute operations vector, a pointer is modified to point to the substitute read routine (372). In the vnode, a pointer is modified to point to the substitute operations vector (376). The vnode is held in memory (380).

In one embodiment, a plurality of files is configured for protection and each file is associated with a substitute operations vector. For example, a file containing employee salary data may be associated with a substitute operations vector that blocks read and write access. A file containing a product earnings report may be associated with a substitute operations vector that blocks write access and logs all attempts to read the report.

There are many other techniques for modifying a vnode. A vnode and routines to execute operations associated with the file may be associated in other ways, depending on the operating system, file system, or other factors. For example, there may be embodiments of the vnode that do not include an operations vector. Depending on the way in which a vnode is associated with a routine, there are numerous ways to associate the vnode with a substitute routine. Some examples include modifying in the vnode a pointer to point to a structure that includes a pointer to a substitute routine and modifying in the vnode a pointer to point to a substitute routine. In one embodiment, the vnode is associated with a plurality of substitute routines.

Figure 4:
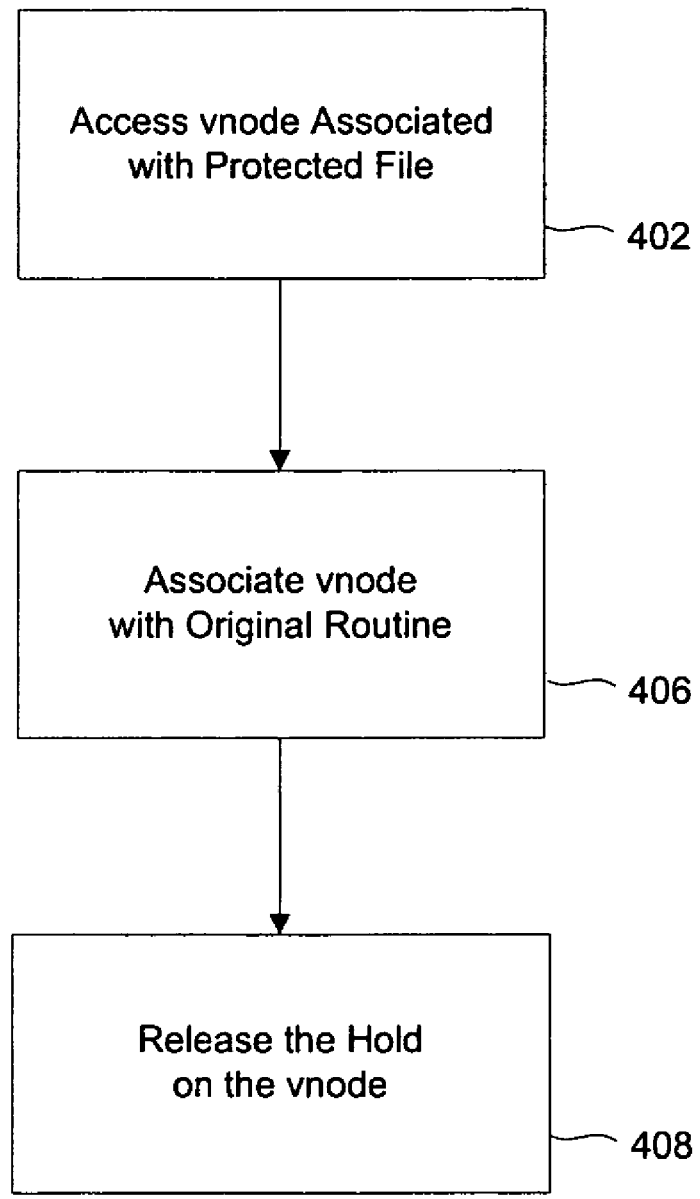
FIG. 4 is a flowchart illustrating a technique used in one embodiment to remove or uninstall protection of a file.

FIG. 4 is a flowchart illustrating a technique used in one embodiment to remove or uninstall protection of a file. In this example, a vnode associated with a protected file is accessed (402). For example, a look up function may be called. In UNIX systems, lookupname may be used.

The vnode is associated with an original routine (406). For example, in the embodiment illustrated in FIG. 2B, vnode 250 originally included a pointer to point to original operations vector 258. When vnode 250 was configured for file protection, the pointer was modified to point to substitute operations vector 254. During removal of file protection, vnode 250 is reassociated with the original routines by modifying in vnode 250 the pointer to point back to original operations vector 258. Once vnode 250 is reassociated with original operations vector 258, substitute operations vector 254 may be freed from memory in this example.

Depending on the way in which the vnode is associated with a routine, there are numerous ways to reassociate the vnode with an original routine. Some examples include modifying in the vnode a pointer to point to a structure that includes a pointer to the original routine and modifying in the vnode a pointer to point to the original routine. In one embodiment, the vnode is reassociated with a plurality of original routines.

In one embodiment, a hold is released on the vnode (408) so that the vnode is free to be removed from memory. In another embodiment, releasing the hold may not be applicable, available, or desired.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting a file, comprising:
   requesting access to a file;
   accessing a vnode associated with the file; and
   executing a substitute routine associated with the vnode;
   wherein the vnode is a modified vnode.

2. The method of claim 1, wherein the substitute routine is associated with the request.

3. The method of claim 1, wherein executing includes protecting the file.

4. The method of claim 1, wherein executing includes blocking access to the file.

5. The method of claim 1, wherein executing includes blocking write access to the file.

6. The method of claim 1, wherein the vnode is associated with a substitute operations vector associated with the substitute routine.

7. The method of claim 1, wherein the vnode includes a pointer that points to a substitute operations vector associated with the substitute routine.

8. The method of claim 1, wherein the vnode includes a pointer that points to a substitute operations vector that calls the substitute routine.

9. The method of claim 1, further comprising configuring the file for protection.

10. The method of claim 9, wherein configuring includes:
    accessing the vnode associated with the file; and
    modifying the vnode.

11. The method of claim 1, further comprising:
    determining an operation to be protected; and
    modifying in the vnode a routine associated with the operation.

12. The method of claim 1, further comprising holding the vnode in memory.

13. The method of claim 1, further comprising saving an original operations vector.

14. The method of claim 1, further comprising:
    determining whether the file exists;
    providing notification when the file is created if the file does not exist.

15. The method of claim 1, further comprising configuring the file for protection prior to runtime.

16. The method of claim 1, further comprising: modifying the vnode.

17. The method of claim 1, further comprising: associating the vnode with a substitute routine.

18. The method of claim 1, further comprising: associating the vnode with a substitute operations vector associated with a substitute routine.

19. The method of claim 1, further comprising: modifying a pointer associated with the vnode to point to a substitute operations vector associated with a substitute routine.

20. The method of claim 1, further comprising: modifying a pointer associated with the vnode to point to a substitute operations vector that calls a substitute routine.

21. The method of claim 1, further comprising removing protection of the file.

22. The method of claim 21, wherein removing includes: accessing the vnode associated with the file; and modifying the vnode.

23. The method of claim 1, further comprising releasing a hold on the vnode.

24. The method of claim 1, further comprising: associating the vnode with an original routine.

25. The method of claim 1, further comprising: associating the vnode with an original operations vector associated with an original routine.

26. The method of claim 1, wherein the vnode is a vnode in a UNIX system.

27. The method of claim 1, wherein the vnode is an inode in a Linux system.

28. A system for protecting a file, comprising a processor and memory configured to:
   request access to a file;
   access a vnode associated with the file; and
   execute a substitute routine associated with the vnode;
   wherein the vnode is a modified vnode.

29. A computer program product for protecting a file, the computer program product being embodied in a computer readable medium and comprising computer instructions for:
   requesting access to a file;
   accessing a vnode associated with the file; and
   executing a substitute routine associated with the vnode;
   wherein the vnode is a modified vnode.

* * * * *